F. E. UNDERWOOD & B. F. ILLSTON.
RECOVERY OF POTASSIUM AND SODIUM COMPOUNDS, FATS, AND OTHER VALUABLE INGREDIENTS FROM WOOL SCOURING LIQUORS.
APPLICATION FILED JUNE 1, 1917.
1,277,784.
Patented Sept. 3, 1918.
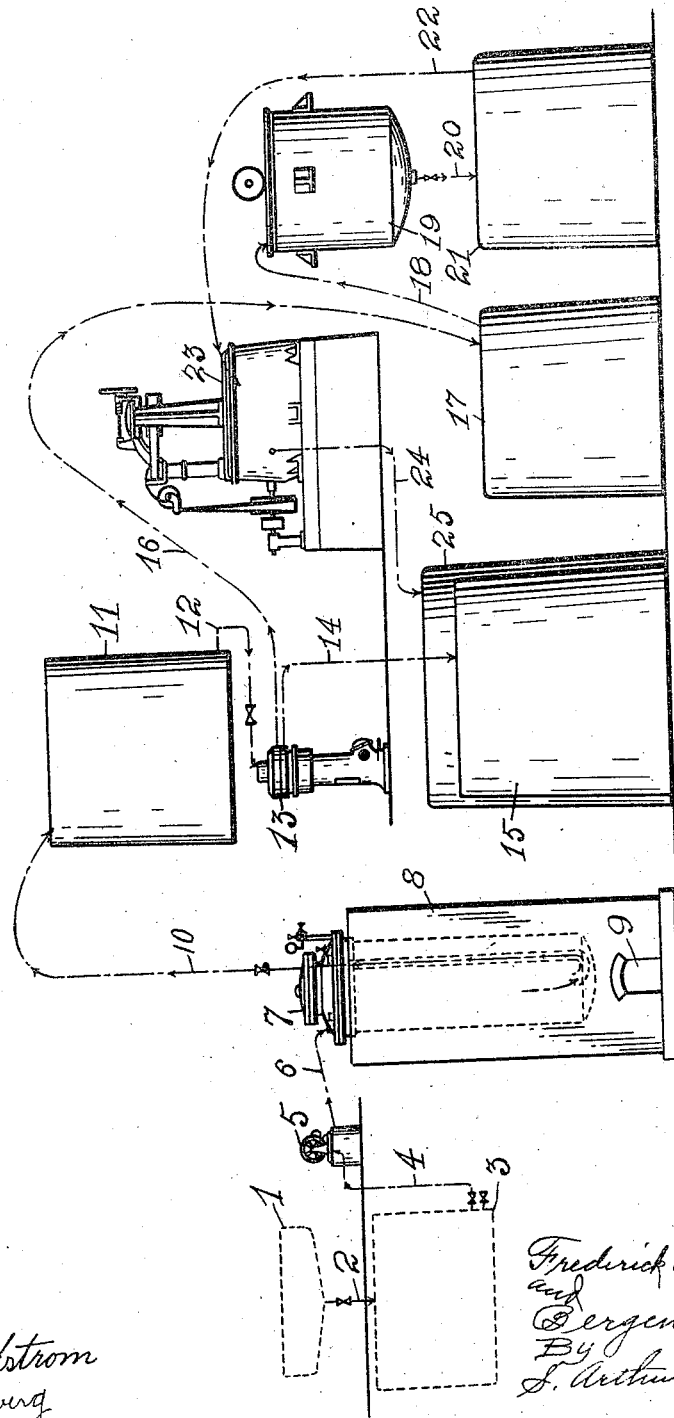

UNITED STATES PATENT OFFICE.

FREDERICK E. UNDERWOOD AND BERGEN F. ILLSTON, OF JAMESTOWN, NEW YORK.

RECOVERY OF POTASSIUM AND SODIUM COMPOUNDS, FATS, AND OTHER VALUABLE INGREDIENTS FROM WOOL-SCOURING LIQUORS.

1,277,784.

Specification of Letters Patent.

Patented Sept. 3, 1918.

Application filed June 1, 1917. Serial No. 172,184.

*To all whom it may concern:*

Be it known that we FREDERICK E. UNDERWOOD and BERGEN F. ILLSTON, citizens of the United States, residing at the city of Jamestown, in the county of Chautauqua and State of New York, have invented certain new and useful Improvements in Recovery of Potassium and Sodium Compounds, Fats, and other Valuable Ingredients from Wool-Scouring Liquors, of which the following, taken in connection with the accompanying drawings, is a specification.

The invention relates to the recovery of the valuable ingredients from wool scouring and other liquors. It is well known that substantially all of the valuable ingredients contained in wool scouring liquors are incorporated therein in emulsion. The emulsion is formed by the natural soap of the fleece in combination with the free fat and the free alkali and soap used in scouring the fleece. It has been difficult to break up this emulsion, chiefly because the attack has been made on the fats instead of upon the binding element or soap. It is true that the fats are the most valuable ingredients but their release is more easily accomplished by attacking the binding element or soap, after which the other ingredients including the fats and substantially all the other ingredients may be easily separated and recovered.

Accordingly the object of our improvement is to change the base of the natural soap of the wool fleece and the soap used in scouring said fleece as emulsified in the scouring liquor, from a potassium or sodium base, said potassium or sodium forming a soluble soap, to a magnesium base rendering it an insoluble soap which is precipitated thereby freeing the valuable potassium salts and making it possible to remove and decompose said insoluble magnesium soap and free the fats and fatty acids and release the magnesium sulfate for reuse; and the invention consists in the novel method and combination hereinafter set forth and claimed.

The accompanying drawing is a diagrammatic illustration of a portion of the apparatus used in our recovery process, the different parts being connected by dotted lines showing the steps in the process.

The numeral 1 designates the wool scouring bowl which is connected by a pipe line 2 to the settling tank 3, which tank is preferably made of concrete and placed in the ground.

The tank 3 is connected by a line 4 to the liquor feed and circulating pump 5 of suitable construction and capacity. The pump 5 is connected by a line 6 to the autoclave 7 which is preferably arranged with a brick jacket 8 and fire place 9 for the proper heating of the same. The autoclave 7 is connected to the receiving tub or tank 11 by the line 10.

The tub or tank 11 is connected by the line 12 to the centrifugal separator 13 which separates the liquor containing potassium and possibly sodium and nitrogen from the magnesium soap liquor, and said potassium liquor is passed through line 14 to the tank 15.

The remaining portion of the scouring liquors are passed from the centrifugal separator 13 through the line 16 to the tank 17 and from thence by the line 18 to the decomposing kettle 19 from which it is passed through the line 20 to the cooling tank 21. After cooling in the tank 21 the liquor is passed through line 22 to the centrifugal 23 which separates the different ingredients, the sulfate liquor passing through the line 24 to the tank 25.

Having described the apparatus, we will now describe the complete process which consists in withdrawing the raw scouring liquor from the wool scouring bowl 1 and allowing the same to settle in the concrete tank 3. After the sand and sediment are settled out of the scouring liquor said liquor is pumped into the autoclave 7 and treated with about three per cent. of its own weight of magnesium sulfate and cooked at a temperature of about 350 degrees Fahrenheit and under a pressure of about 125 pounds. The auto-clave process retains all the ingredients in said liquor including volatile fatty acids.

The hot liquor is then drawn off by its own pressure through the pipe 10 to the settling tank or tub 11. When there is a comparatively small amount of the scouring liquor and plenty of time for separating the same said scouring liquor may be allowed to settle in the settling tank 11, all the fats falling to the bottom as or with insoluble soaps, after the thorough cooking in the auto-clave 7 with the magnesium sulfate ingredient. After settlement has taken place the supernatant liquor containing potassium and possibly sodium and nitrogen is drawn off to the storage tank 15 from the settling tank 11.

Usually, however, there is a large quantity of the scouring liquor particularly in factories of any size and the process must be hastened. Accordingly, a centrifugal separator 13 is provided which immediately takes the cooked scouring liquor containing the potassium from the tank 11 and separates the clear liquor from the remaining portion of said scouring liquor, said clear liquor being passed through the line 14 to the storage tank 15 and the remaining portion of the scouring liquor which contains all the fats is passed out through the line 16 into the tank 17 for the magnesia soap liquor; this is ofttimes almost a paste and has to be heated to liquefy the same.

The liquor in tank 15 is drawn off and concentrated in a vacuum evaporator and then evaporated to dryness on a suitable drum or other drier so that the potassium and sodium compounds and nitrogen contained therein are thereby rendered marketable.

The remaining portion of the treated liquor or magnesium soap liquor in tank 17 is passed through line 18 to a steam jacketed kettle 19 in which it is treated with about one per cent. of its weight of sulfuric acid and thoroughly cooked. The kettle 19 is provided with a stirring device and the magnesium soap liquor is agitated until thoroughly decomposed and the resulting mass of crude fat and liquor is then passed through the line 20 into the cooling tank 21. After thoroughly cooling in the tank 21 the liquor is passed through the line 22 to the centrifugal 23 in which the fatty matter is separated from the magnesium sulfate liquor and said magnesium sulfate liquor is then passed through the line 24 to the storage tank 25, from which it is withdrawn and concentrated in a vacuum evaporator to be used again in the original autoclave process. Said fatty matter may be separated from the magnesium sulfate liquor by filtration but this is a much slower means of attaining the desired end. The crude fat will be treated by suitable refining processes to render it marketable.

We claim as new:—

1. The process of recovering the valuable ingredients from wool scouring liquors or the like, which consists in treating the liquor with a salt of an alkaline earth metal not injurious to the organic compounds in the liquor, heating the liquor to a temperature of approximately 350 degrees and subjecting the same to a pressure of approximately 125 pounds to the square inch during the treatment of the liquor for freeing the potassium and sodium and for separating all fats from the liquor as or with insoluble soaps.

2. The process of recovering the valuable ingredients from wool scouring liquors or the like, which consists in treating the liquor with magnesium sulfate and heating under pressure the liquor during treatment for freeing the potassium and sodium and for separating all fats from the liquor as or with insoluble soaps.

3. The process of recovering the valuable ingredients from wool scouring liquors or the like, which consists in treating the liquor with magnesium sulfate and heating under pressure the liquor during treatment for freeing the potassium and sodium and for separating all fats from the liquor as or with insoluble soaps, removing the insoluble soap from the liquor and treating the same with an acid to free the fats and to recover the magnesium sulfate for re-use.

4. The process of recovering the valuble ingredients of wool scouring liquors and the like, which consists in treating the liquor with a magnesium sulfate, heating the liquor to a temperature approximately 350° and subjecting the same to a pressure of substantially 125 pounds to the square inch during treatment.

5. The process of recovering the valuable ingredients of wool scouring liquors and the like, which consists in treating the liquor with a magnesium sulfate, heating the liquor to a temperature approximately 350° and subjecting the same to a pressure of substantially 125 pounds to the square inch during treatment, removing the insoluble soaps from the liquor and recovering the potassium and sodium from said liquor by evaporation.

6. The process of recovering the valuable ingredients of wool scouring liquors and the like, which consists in treating the liquor with a magnesium sulfate, heating the liquor to a temperature approximately 350° and subjecting the same to a pressure of substantially 125 pounds to the square inch during treatment, removing the insoluble soaps from the liquor and recovering the potassium and sodium from said liquor by evaporation, and treating the insoluble soaps with an acid to free the fats and for recovering the magnesium sulfate for re-use.

In testimony whereof we have affixed our signatures in the presence of two witnesses.

FREDERICK E. UNDERWOOD.
BERGEN F. ILLSTON.

Witnesses:
H. A. SANDBERG,
I. E. NORDSTROM.